US008918571B2

United States Patent
Myrah et al.

(10) Patent No.: US 8,918,571 B2
(45) Date of Patent: Dec. 23, 2014

(54) EXPOSING EXPANDERS IN A DATA STORAGE FABRIC

(75) Inventors: Michael G. Myrah, Cypress, TX (US); Balaji Natrajan, Spring, TX (US); Pruthviraj Herur Puttaiah, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 13/151,009

(22) Filed: Jun. 1, 2011

(65) Prior Publication Data

US 2012/0311224 A1    Dec. 6, 2012

(51) Int. Cl.
*G06F 13/00* (2006.01)
*H04L 12/931* (2013.01)

(52) U.S. Cl.
CPC ................................ *H04L 49/455* (2013.01)
USPC ............ 710/300; 710/314; 710/316; 711/114

(58) Field of Classification Search
CPC . G06F 3/0689; G06F 11/201; G06F 11/2089; G06F 13/409
USPC .......................................... 710/300, 314, 316
See application file for complete search history.

(56) References Cited

U.S. PATENT DOCUMENTS

| | | | |
|---|---|---|---|
| 7,035,952 B2 * | 4/2006 | Elliott et al. ................... | 710/300 |
| 7,437,462 B2 | 10/2008 | Marks et al. | |
| 7,644,168 B2 * | 1/2010 | Grieff et al. .................... | 709/229 |
| 7,787,452 B2 | 8/2010 | Jones | |
| 7,913,037 B2 * | 3/2011 | Nakajima et al. .............. | 711/114 |
| 7,921,185 B2 * | 4/2011 | Chawla et al. ................. | 709/217 |
| 8,074,105 B2 * | 12/2011 | Kalwitz et al. ................ | 714/6.22 |
| 8,219,714 B2 * | 7/2012 | Forte et al. ......................... | 710/2 |
| 8,255,607 B2 * | 8/2012 | Jones et al. .................... | 710/316 |
| 8,276,003 B2 * | 9/2012 | Andresen et al. .............. | 713/300 |
| 8,484,416 B2 * | 7/2013 | Smith ............................ | 711/114 |
| 2003/0163592 A1 * | 8/2003 | Odenwald ...................... | 709/250 |
| 2008/0313658 A1 | 12/2008 | Cagno et al. | |
| 2009/0083484 A1 * | 3/2009 | Basham et al. ................ | 711/114 |
| 2009/0094620 A1 | 4/2009 | Kalwitz et al. | |
| 2010/0036948 A1 * | 2/2010 | Cassiday et al. ............... | 709/225 |
| 2010/0070662 A1 | 3/2010 | Odenwald et al. | |
| 2012/0271996 A1 * | 10/2012 | Jenkins et al. ................. | 711/114 |
| 2013/0111126 A1 * | 5/2013 | Myrah et al. ................... | 711/114 |

OTHER PUBLICATIONS

Heng Liao; Tim Symons; Rachelle Trent, Managing Access Control through SAS Zoning, http://www.scsita.org/aboutscsi/sas/WP_PMC—Sierra_SAS_0905.pdf, Publication Date: Sep. 2005.

* cited by examiner

*Primary Examiner* — Brian Misiura
(74) *Attorney, Agent, or Firm* — Dicke, Billig & Czaja, PLLC; Patrick G. Billig

(57) ABSTRACT

A method of selectively exposing expanders in a data storage fabric is disclosed. The method includes generating a phy permission table in a switch expander. The phy permission table is configured for access by an initiator and includes data as to which enclosure expanders are discoverable by the initiator. A zone group of phys from the enclosure expanders assigned to the initiator is created. The phy permission table is updated to identify each phy coupled to the enclosure expanders in the zone group.

20 Claims, 3 Drawing Sheets

EXPOSING EXPANDERS IN A DATA STORAGE FABRIC

BACKGROUND

In data storage technology, Small Computer System Interface, or SCSI, is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and compact disc drives. The SCSI standard defines command sets for specific peripheral device types; the presence of "unknown" as one of these types means it can be used as an interface to almost any device, but the standard is highly pragmatic and addressed toward commercial requirements such as Redundant Array of Independent Disks, or RAID.

Since the public introduction of SCSI in 1981, there have been no less than seven generations of the parallel SCSI protocol. Each generation doubled the bandwidth of the previous one, primarily by doubling the bus clock frequency. But as the bus frequency was increased with each new generation, so did the negative impact of bus contention, signal degradation, and signal skew, i.e., slight signal delays from one wire trace to the next. After the development of Ultra320 SCSI standard with a bandwidth of 320 MB/s per channel, further bandwidth improvements to parallel SCSI could not occur without developing new and expensive technologies.

Serial Attached SCSI, commonly referred to as SAS, is a relatively recently-developed computer bus used to move data to and from computer storage devices. SAS was later transferred to the InterNational Committee for Information Technology Standards (INCITS) T10 to become an American National Standards Institute, or ANSI, and International Organization for Standardization/International Electrotechnical Commission, or ISO/IEC, standard. SAS uses on a point-to-point serial protocol that replaces the parallel SCSI bus technology in data centers and workstations. SAS applies the command set from parallel SCSI, frame formats and full duplex communication of Fibre Channel. Also, SAS uses the Serial Advanced Technology Attachment, often abbreviated Serial ATA or simply SATA, interface for compatibility and investment protection. The SAS architecture addresses the parallel SCSI problems of bus contention, clock skew, and signal degradation at higher signaling rates, and can provide performance headroom in enterprise storage applications over SCSI.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
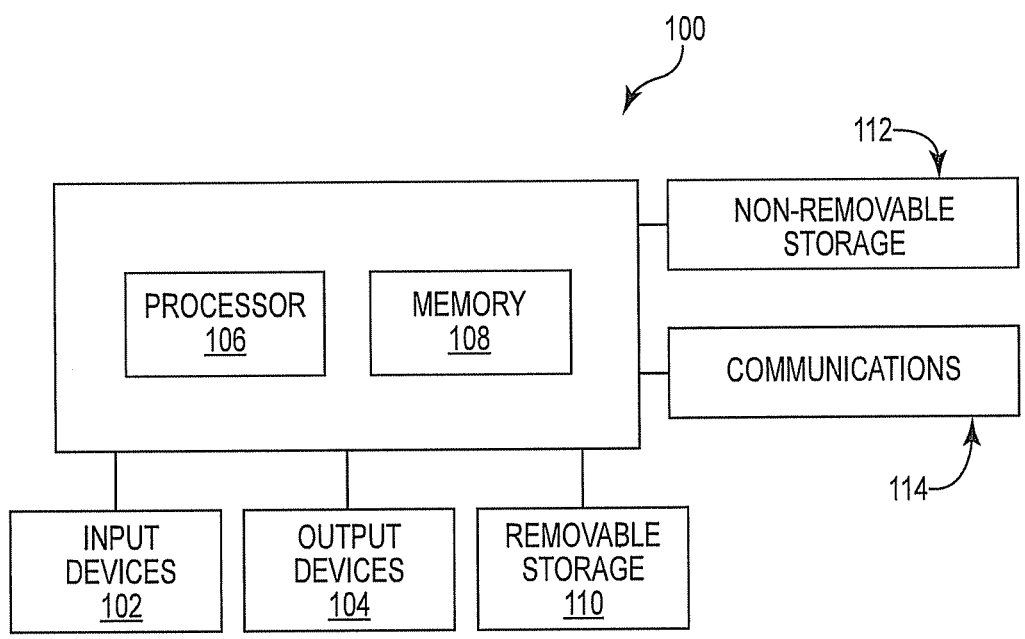
FIG. 1 is a block diagram illustrating an example computing device.

FIG. 1 illustrates an embodiment of a computer system that can be employed in an operating environment as a server and includes a computing device 100. In one example, the computing device 100 can include or can be coupled to one or more input devices 102, such as keyboard, pointing device (e.g., mouse), voice input device, touch input device, or the like. Computing device 100 can also include or can be coupled one or more output devices 104, such as a display, printer, or the like. In a basic configuration, computing device 100 typically includes a processor architecture having at least one processing unit, i.e., processor 106, and memory 108. Depending on the configuration and type of computing device, memory 106 may be volatile, non-volatile, or some combination of the two. The memory 108 can be arranged in a memory hierarchy such as a cache. Computing device 100 can also include additional storage including, but not limited to, magnetic or optical disks or solid state memory, or flash storage devices such as removable storage 110 and non-removable storage 112 for storage of information such as computer readable instructions, data structures, program modules or other data. The computing device 100 can be configured to run an operating system software program that can be stored on the storage media as well as one or more software applications, which make up a system platform.

Memory 108, removable storage 110 and non-removable storage 112 are all examples of computer storage media that can be used to store the desired information and that can be accessed by computing device 100. Computer storage media can be part of computing device 100. Computing device 100 can also include one or more communication connections 114 that allow the computing device 100 to communicate with other computers/applications, such as the nodes on a network or other aspects of the control system such as databases, agents, and so on. These other computers/applications can be used to store desired information that can be accessed by computing device 100.

Figure 2:
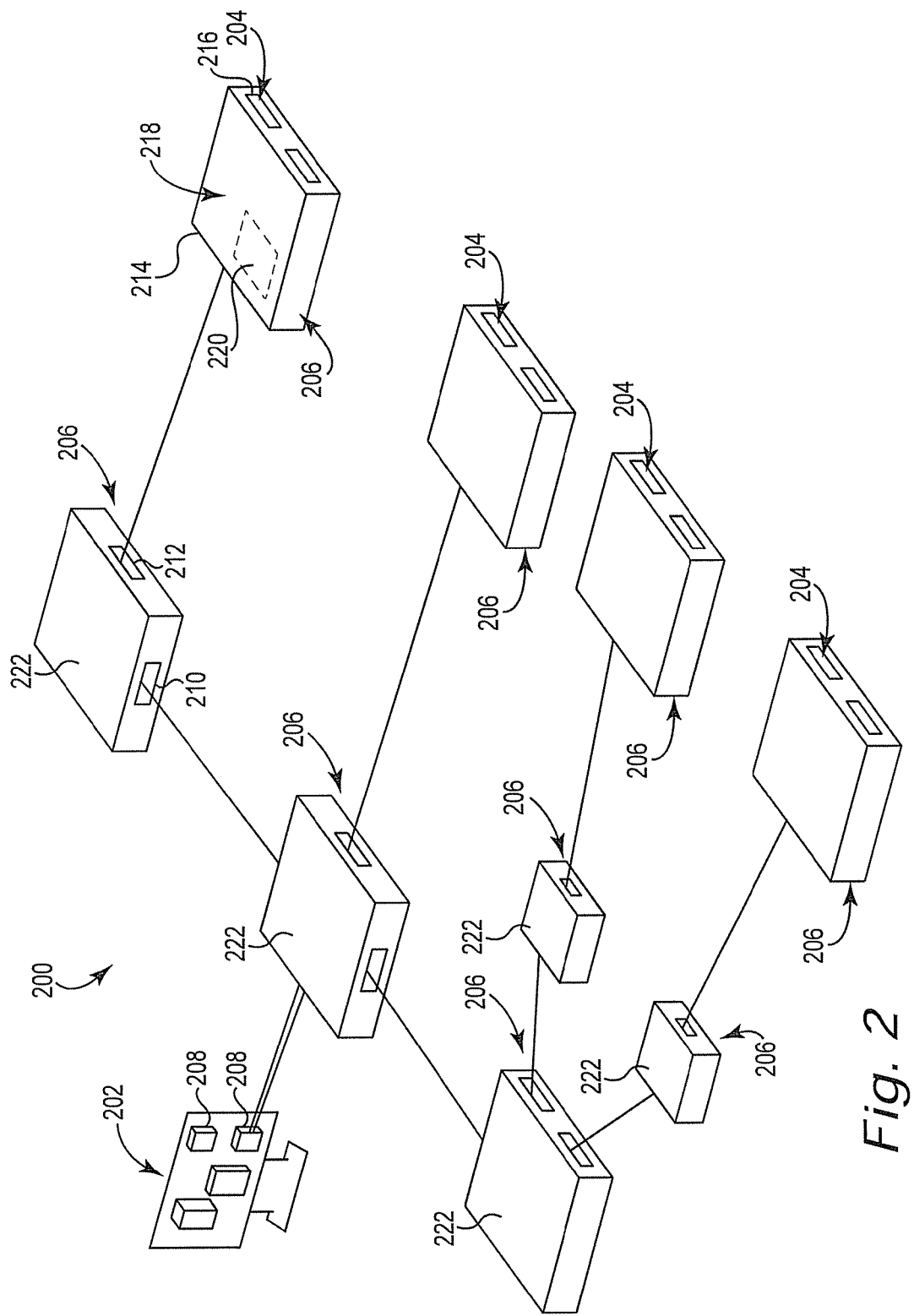
FIG. 2 is a schematic diagram illustrating an example SAS fabric that can be configured to employ computing devices such as the example computing device of FIG. 1.

FIG. 2 illustrates an example SAS fabric, or SAS domain 200. SAS is a point-to-point architecture that transfers data to and from SCSI storage devices by using serial communication. In general, an SAS domain is an input/output (I/O) system having of a set of SAS devices that communicate with one another by means of a service delivery subsystem. SAS devices in the SAS domain 200 use to achieve reliable, high-speed serial communication in general include initiators 202, targets 204, and expanders 206. Each SAS device has a unique worldwide name, or SAS address, which identifies of an initiator port, a target port, or an expander device, assigned at manufacturing to simplify its identification in a domain.

The initiator 202 is a host bus adaptor (HBA), or controller that at times may be a stand-alone device or can be included as a component in the computing device 100. The initiator 202 is attached to one or more targets 204, such as SAS hard disk drives, SATA hard disk drives, and SAS tape drives, to form an SAS domain. An initiator 202 often includes one or more of Serial SCSI Protocol (SSP) ports typically used to communicate with SAS drives, Serial ATA Tunneling Protocol (STP) ports typically used to communicate with SATA drives, and/or Serial Management Protocol (SMP) ports typically used to communicate with expanders 206 in an SAS domain.

An SAS initiator 202 typically includes multiple ports 208 for connection to internal targets, external targets, such as targets 204, or both. An internal target can include, for example, a RAID system including SAS or SATA drives included within the computing device 100, which can include a server. Each initiator port can have a single physical link, which can be referred to as a narrow port, or 2, 4, 8 or more physical links, which can be referred to as a wide port and are described below. SAS initiator ports can be connected to separate domains for fail-over redundancy. SAS hard drives (such as enterprise-class and midline devices) can have two narrow ports. Each port can reside in a different SAS domain to provide fail-over redundancy and load balancing. SAS hard drives leverage a common electrical and physical connection interface with SATA hard drives. However, SATA hard drives, including solid-state drives, can have a single narrow port.

A phy is a mechanism that contains a transceiver that electrically interfaces to a physical link. Phy is a common abbreviation for the physical layer of the OSI model. A physical link includes two differential signal pairs, one pair in each direction, that connect two physical phys. A wide port includes more than one phy, and a wide link is a group of physical links that attaches a wide port to another wide port.

Expanders 206 are high-speed switches that scale the number of targets 204 attached to an initiator 202, thereby creating a larger SAS domain 200. Expanders 206 establish connections between initiators 202, targets 204, and other expanders 206 by receiving commands and data in one port, such as a port 210 proximal to the initiator 202, and routing them to another port, such as port 212 distal to the initiator 202, based on the SAS address of the target 204. In some examples, an expander 214 includes a port distal to the initiator 202 directly coupled to a target 216, such as within a storage enclosure 218 and can be referred to here as an enclosure expander 214. The storage enclosure 218 can include multiple targets 216 and a storage enclosure processing system 220 in addition to the enclosure expander 214. In other examples, an expander 222 includes a port distal to the initiator 202 directly coupled to another expander 206 and can be referred to here as a switch expander 222. In the illustrated example, the initiator 202 is coupled to switch expander 222 that is coupled to an enclosure expander 214 that is coupled to the targets 216.

Expanders 206 use three routing methods—direct, table, and subtractive. An expander, such as enclosure expander 214, uses direct routing to forward commands and data to targets 216 directly attached to the enclosure expander 214. An expander, such as switch expander 222, uses table routing to forward commands and data to another expander, such as enclosure expander 214 or to another switch expander (not shown). Table routing is used for identifying devices connected to the expanders connected to a device's own phy. When an expander 206 receives an address that it does not recognize, it uses subtractive routing to forward the commands and data to another expander 206 that does recognize the address.

The number of SAS devices in a given domain 200 is limited only by the size of the expander routing tables, but managing a large number of devices can be complicated. Zoning is a management tool included in the SAS standard, such as SAS-2 and above, to provide for traffic management and security. Second-generation SAS (SAS-2) link speed doubles the physical link rate to 6.0 Gb/s. SAS-2 eliminates the distinction between fanout and edge expanders with self-configuring expanders. SAS-2 also enables zoning for enhanced resource deployment flexibility, security, and data traffic management, explained below. SAS-2 is backward compatible with SAS-1.

Through the use of zoning, large physical topologies can be broken into logical groups such as zone groups, which are a set of phys in a zone that all have the same access permission. A group of zoning-enabled expanders that cooperate to control access between phys is known as a zoned portion of a service delivery system (ZPSDS). Examples of zoning include 128 or 256 zone groups numbered from 0 to 127 or 0 to 255, respectively. Zone groups 0 through 7 are pre-defined in the SAS standard. Devices in zone group 0 can only access devices in zone group 1, while devices in zone group 1 are allowed access to all zone groups. For example, a system administrator can use zone group 0 for a new (unassigned) device that is added to a ZPSDS. The administrator can also use zone group 1 for topology discovery and zone management. In one example, one ZPSDS is created per fabric 200.

Permission tables in SAS expanders 206 control zoning. An end device does not require any special features to operate within a zoned SAS domain, which makes legacy SAS and SATA devices compatible. An end device in a zone can interface with other end devices in the domain as permitted by the zoning expander. The SAS-2 standard permits zoning, a secure zoning method that uses the unique identifier (ID) number of each expander phy. In zoning, each port of a zoning expander is assigned to a zone group, and any device attached to one of the ports becomes part of that respective zone group. Devices within a zone group can interact with each other. The permission table in the expander controls access between devices in different zone groups. If an attached device changes, the expander may be configured to set the zone group to 0, or no access, which allows an address-resolved-like policy to be implemented A zone manager is responsible for configuring each zone. The zone manager can control a zone by using an end device that has an SAS port connected to one of the zoning expanders. The zone manager can also control a zone through a sideband interface (such as Ethernet) on one or more zoning expanders. The zone manager assigns zone groups to all zoning expander phys, and it assigns all phys in a wide port to the same zone group. The zone manager stores the zoning assignment of each expander phy along with SAS addresses in the zoning expander's route table. Inside a particular ZPSDS, the zone manager assigns each zoning expander phy attached to another zoning expander phy to zone group 1. Phys in zone group 1 have access to phys in all zone groups. The zone manager assigns each zoning expander phy on the boundary of the ZPSDS to a zone group other than group 1. The ZPSDS boundary is defined by designating expander phys as "not trusted" when connected to end devices outside the zone. Each zoning expander device also contains a zone permission table that controls whether a connection is allowed between phys in different zone groups.

SAS fabrics 200 with multiple initiators 202 are some of the most intensive SAS configurations to develop from a firmware development and system engineering perspective. An example blade server environment, such as one sold under the trade designation BladeSystem available from Hewlett-Packard Co. of Palo Alto, Calif., can include 1 to 16 or more initiators present depending on the configuration. When zoning-enabled storage enclosures 218 are present in the SAS fabric 200, each initiator 202 will have access to the expander 214 and possibly the storage enclosure processor 220 (SEP) within each storage enclosure 218 even if there is no zone group containing drive bays from that storage enclosure 218 assigned to that initiator 202 according to the SAS-2 specification. The SAS-2 specification further sets out that the boundary of the ZPSDS includes the zoning capable storage enclosure expanders 214 as well, which allows all initiators 202 to discover and send commands to these expanders 214.

Systems where all initiators have visibility to all storage enclosure expanders include certain risks. For example, even though customers may not assign a few drive bays from each storage enclosure 218 to each initiator 202, the engineering team must still cover this worst case scenario even if it extends time to market by several months or more. Better is to cover the most common cases at launch, and then cover more cases with a maintenance release several months later. A SAS fabric development cycle typically occurs every time newer generation controllers and expanders are rolled out, for instance, moving from 3 Gb/s expanders to 6 Gb/s expanders.

Another risk is a malfunctioning enclosure expander can disrupt I/O on initiators that do not have any drive bays from the malfunctioning storage enclosure assigned to them. This can occur if an enclosure expander is not responding to SMP SAS commands such as commands used in discovery. It could also occur if the storage enclosure processor 220 is busy working on commands from other initiators and cannot allocate resources for SSP commands from a particular initiator. In this case, all initiators might hang at post. In extreme cases, infinite discovery processes can occur from all initiators which can cripple an SAS fabric and can result in drive I/O commands timing out. In this case it is possible for a malfunctioning storage enclosure to interfere and fail logical drives on other non-malfunctioning storage enclosures.

Figure 3:
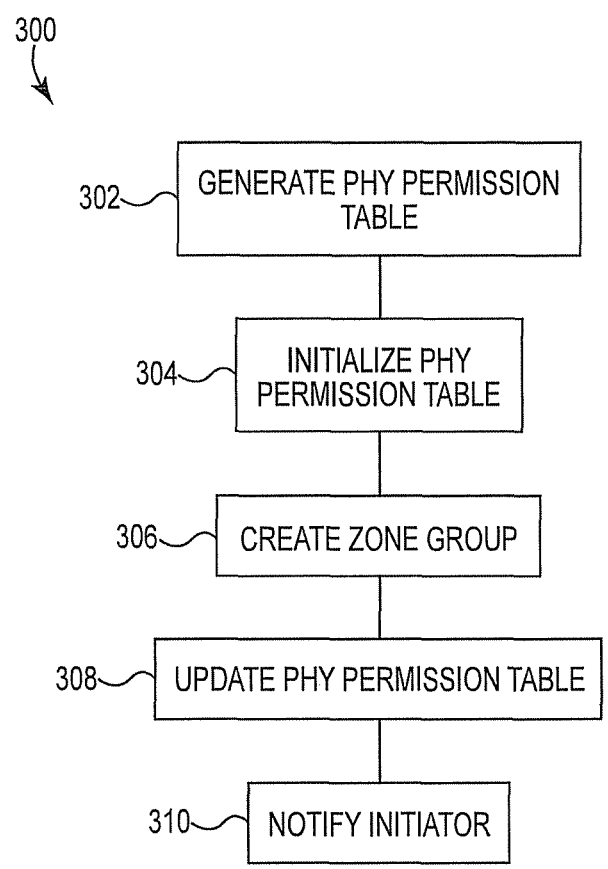
FIG. 3 is a block diagram illustrating an example method for selectively exposing enclosure expanders in the SAS fabric of FIG. 2.

FIG. 3 illustrates an example method 300 for selectively exposing enclosure expanders, such as enclosure expander 214, in an SAS fabric 200. In general, initiators 202 can see or discover all switch expanders 222 but cannot discover all enclosure expanders 204. Initiators 202 are able to only discover storage enclosures expanders with phys (drive bays) zoned to that initiator.

In the example method 300, the switch expanders 222 will include a phy permission table in addition to any zone permission table, at 302. The phy permission table can be configured as a data structure such as a linked list in the memory of the switch expander 222. When an initiator sends a form of discover command, such an "SMP DISCOVER" or "SMP DISCOVER LIST" command to a phy associated with the switch expander 222, the switch expander 222 will check this table to determine if the source zone group of the initiator has permission to access this phy. If the source zone group is not allowed access, the switch expander will block discovery and a corresponding response indicative of no access allowed.

Several examples of a corresponding response are contemplated. Among these examples, a response such as a "PHY VACANT" can be sent to the initiator so as not to permit the requesting initiator to discover the corresponding phy. There are alternatives to PHY VACANT. For example, the switch expander could return "NO DEVICE ATTACHED" as the "ATTACHED DEVICE TYPE" in the "SMP DISCOVER RESPONSE." There are also other "FUNCTION RESULTS" that may be used other than "PHY VACANT." In the example, however, the switch expander 222 blocks initiator 202 discovery by manipulating "DISCOVER" and "DISCOVER LIST" response data based on the phy permission table but allows SAS switch discovery as the default behavior.

In one example, the phy permission table includes at least one phy corresponding with at least one source zone group list. An example phy permission table is shown below.

| PHY ID | SOURCE ZONE GROUP LIST |
| --- | --- |
| 16 | 1, 2 |
| 17 | 1, 2 |
| 18 | 1, 2 |
| 19 | 1, 2 |
| ... | |

The phy permission table is initialized with all phys granted access to zone group 1 (zone group that has access to all other zone groups) and 2 (zone group for zone manager access) at 304. If an initiator with source zone group other than 1 or 2 issues, for example, an "SMP DISCOVER" command to any phy in the switch expander 222, a response such as "PHY VACANT" will be returned preventing the initiator 202 from discovering any attached devices.

The switch zone manager can be configured to manipulate the phy permission table using vendor specific SMP commands, such as "SMP REPORT PHY PERMISSION TABLE" and "SMP CONFIGURE PHY PERMISSION TABLE." In one example, a user, through the zone manager, can create a zone group by specifying phys, such as drive bays, from one or more storage enclosures at 306. When the zone group is created at 306 and assigned to an initiator, the zone manager will update the phy permission table with the initiator zone group for all phys attached to the storage enclosure using a command at 308, such as the "SMP CONFIGURE PHY PERMISSION TABLE" command.

As an example, if the source zone group of the initiator is 8 and the storage enclosure is attached to switch expander phys 16 thru 19, the phy permission table will be updated as shown below:

| PHY ID | SOURCE ZONE GROUP LIST |
| --- | --- |
| 16 | 1, 2, 8 |
| 17 | 1, 2, 8 |
| 18 | 1, 2, 8 |
| 19 | 1, 2, 8 |
| ... | |

In one example, a notification can be sent from the switch expander to the initiator after the updated phy permission table is saved so the initiator could begin discovery at 310. The notification, in one example, can include a "BROADCAST (CHANGE)." If the initiator issues a discover command, such as SMP DISCOVER, to the phy attached to the storage closure enclosure, a normal response will now be sent back providing details of the attached enclosure expander.

Using method 300, a zone manager can reduce time to market of the SAS fabric 200 by catering to more common use cases rather than supporting the worst case N to N initiator to storage enclosure scenarios that most customers are not known to use. Additionally, the method 300, or fabric using the method, allows for more robust enterprise level SAS fabric design by allowing the zone manager to not permit discovery of a malfunctioning storage enclosure to result in failed logical volumes on initiators that are not even assigned to that storage enclosure.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of exposing expanders in a data storage fabric, wherein the data storage fabric includes an initiator, a switch expander, and a plurality of enclosure expanders, wherein an enclosure expander of the plurality of enclosure expanders includes a plurality of phys, the method comprising:
generating a phy permission table in the switch expander, wherein the phy permission table is configured for access by the initiator and includes data as to which phys in a subset of less than the plurality of phys in the enclosure expander are discoverable by the initiator, wherein phys in the enclosure expanders not listed in the phy permission table in the switch expander are not discoverable by the initiator;
creating a zone group of phys from the enclosure expanders assigned to the initiator; and
updating the phy permission table to identify each phy coupled to the enclosure expanders in the zone group.

2. The method of claim 1 wherein the data storage fabric includes at least one initiator coupled to at least one switch expander, wherein each switch expander is coupled to at least one enclosure expander, and wherein each enclosure expander is coupled to at least one phy.

3. The method of claim 1 wherein the enclosure expander is included in a storage enclosure, and the storage enclosure further includes a processor and a memory.

4. The method of claim 1 wherein the data storage fabric is a serial attached small computer system interface (SAS) system.

5. The method of claim 1 wherein the SAS system is a second generation SAS.

6. The method of claim 1 wherein the initiator sends a discover command to the switch expander, and the phy permission table is referenced to determine if the zone group corresponding with the initiator has permission to access a phy corresponding with the discovery command.

7. The method of claim 1 wherein the switch expander blocks discovery of a phy if the permission table does not permit the initiator to discover the enclosure expander corresponding to the phy.

8. The method of claim 7 wherein the switch expander sends a response to the initiator if the permission table does not permit the initiator to discover the enclosure expander corresponding with the phy.

9. The method of claim 8 wherein details of the enclosure expander corresponding with the phy is provided to the initiator if the phy permission table permits the initiator to discover the enclosure expander.

10. The method of claim 1 wherein the data storage fabric includes a zone manager operably coupled to the switch expander, and the updating the phy permission table is performed with the zone manager.

11. The method of claim 10 wherein the switch expander sends a notification to the initiator after the zone manager updates the phy permission table.

12. A switch expander in a data storage fabric, the switch expander comprising:
a first port operably coupleable to an initiator;
a second port operably coupleable to an enclosure expander, wherein the enclosure expander is coupled to a plurality of phys;
a memory system including a phy permission table stored the memory system;
wherein the phy permission table is configured to be accessed by the initiator and includes data as to whether initiator can discover the enclosure expander and data as to which phys in a subset of less than the plurality of phys in the enclosure expander are discoverable, wherein phys in the enclosure expander not listed in the phy permission table in the switch expander are not discoverable by the initiator.

13. The switch expander of claim 12 wherein the phy permission table is included in a data structure stored in the memory.

14. The switch expander of claim 13 wherein the data structure includes at least one phy corresponding with at least one source zone group list.

15. The switch expander of claim 14 configured to receive updates to the phy permission table and configurable to notify the initiator after the phy permission table has been updated.

16. The switch expander of claim 12 wherein the data storage fabric is a serial attached small computer system interface (SAS) system.

17. A computer readable storage medium storing computer executable instructions for controlling a computing device to perform a method of exposing expanders in a data storage fabric, wherein the data storage fabric, includes an initiator, a switch expander, and a plurality of enclosure expanders, wherein an enclosure expander of the plurality of enclosure expanders includes a plurality of phys, the method comprising:
generating a phy permission table in the switch expander, wherein the phy permission table is configured for access by the initiator and includes data as to which phys in a subset of less than the plurality of phys in the enclosure expander are discoverable by the initiator, wherein phys in the enclosure expander not listed in the phy permission table in the switch expander are not discoverable by the initiator;
creating a zone group of phys from the enclosure expanders assigned to the initiator; and
updating the phy permission table to identify each phy coupled to the enclosure expanders in the zone group.

18. The computer readable storage medium of claim 17 and further comprising using commands corresponding to a serial attached small computer system interface (SAS) system.

19. The computer readable storage medium of claim 17 wherein the generating the phy permission table includes generating a linked list in a memory of the switch expander.

20. The method of claim 1 wherein the switch expander blocks initiator discover by manipulating "DISCOVER" and "DISCOVERL LIST" response data based on the phy permission table, while enabling SAS switch discovery as a default behavior.

* * * * *

UNITED STATES PATENT AND TRADEMARK OFFICE
CERTIFICATE OF CORRECTION

| | |
|---|---|
| PATENT NO. | : 8,918,571 B2 |
| APPLICATION NO. | : 13/151009 |
| DATED | : December 23, 2014 |
| INVENTOR(S) | : Michael G. Myrah et al. |

It is certified that error appears in the above-identified patent and that said Letters Patent is hereby corrected as shown below:

In the Claims

In column 8, line 34, in Claim 17, delete "fabric, includes" and insert -- fabric includes --, therefor.

In column 8, line 58, in Claim 20, delete "discover" and insert -- discovery --, therefor.

Signed and Sealed this
Seventh Day of July, 2015

Michelle K. Lee
*Director of the United States Patent and Trademark Office*